United States Patent [19]

Campbell et al.

[11] Patent Number: 4,728,169

[45] Date of Patent: Mar. 1, 1988

[54] METHODS AND APPARATUS FOR OPTICAL FIBER SYSTEMS

[75] Inventors: Bruce D. Campbell, Portola Valley; James T. Triplett, Livermore; Richard E. Tylor, Fremont, all of Calif.

[73] Assignee: Raychem Corp., Menlo Park, Calif.

[21] Appl. No.: 602,242

[22] Filed: Apr. 19, 1984

Related U.S. Application Data

[60] Division of Ser. No. 437,053, Oct. 27, 1982, abandoned, which is a continuation-in-part of Ser. No. 370,321, Apr. 21, 1982, abandoned, which is a continuation-in-part of Ser. No. 258,079, Apr. 27, 1981, abandoned.

[51] Int. Cl.[4] .................................. G02B 6/26
[52] U.S. Cl. ................................ 350/96.15; 350/320
[58] Field of Search ............... 350/96.15, 96.21, 73.1, 350/400; 156/158, 159, 204.2, 502

[56] References Cited

U.S. PATENT DOCUMENTS

| | | |
|---|---|---|
| 3,045,223 | 7/1962 | Kapany et al. . |
| 3,244,075 | 4/1966 | Richards et al. . |
| 3,412,255 | 11/1968 | Krieger . |
| 3,449,036 | 6/1969 | Jacobsen . |
| 3,617,109 | 11/1971 | Tien . |
| 3,777,149 | 12/1973 | Marcatili . |
| 3,800,388 | 4/1974 | Borner et al. . |
| 3,864,019 | 2/1975 | Smolinsky et al. . |
| 3,883,217 | 5/1978 | Love et al. . |
| 3,902,786 | 9/1975 | Brown . |
| 3,936,631 | 2/1976 | Muska . |
| 3,938,895 | 2/1976 | Bridger et al. . |
| 3,982,123 | 9/1976 | Goell et al. . |
| 4,021,097 | 5/1977 | McMahon . |
| 4,072,399 | 2/1978 | Love . |
| 4,089,584 | 5/1978 | Polczynski . |
| 4,102,579 | 7/1978 | Stewart . |
| 4,102,717 | 7/1978 | Hensel . |
| 4,125,768 | 11/1978 | Jackson et al. . |
| 4,135,780 | 1/1979 | Dyott . |
| 4,136,929 | 1/1979 | Suzaki . |
| 4,142,877 | 3/1979 | Auracher et al. . |
| 4,234,969 | 11/1980 | Singh . |

(List continued on next page.)

FOREIGN PATENT DOCUMENTS

| | | |
|---|---|---|
| 2064503 | 12/1970 | Fed. Rep. of Germany . |
| 2409455 | 9/1975 | Fed. Rep. of Germany . |
| 2626839 | 12/1977 | Fed. Rep. of Germany . |
| 2841133 | 4/1980 | Fed. Rep. of Germany . |
| 2849501 | 5/1980 | Fed. Rep. of Germany . |
| 5088683 | 1/1977 | Japan . |
| 5224546 | 2/1977 | Japan . |

(List continued on next page.)

OTHER PUBLICATIONS

Advances in Ceramics, V. 2, Physics of Fiber Optics (Eds) Bernard Bendew and Shashauka S. Mitra, The American Ceramic Society (1981), pp. 14-20.

(List continued on next page.)

Primary Examiner—Michael Ball
Attorney, Agent, or Firm—Dennis E. Kovach; Timothy H. P. Richardson

[57] ABSTRACT

Methods, apparatus and articles for systems comprising optical fibers, in particular for feeding an optical signal into an optical fiber through the buffer thereof and for withdrawing an optical signal from an optical fiber through the buffer thereof. Preferably this is achieved with the aid of an optical coupling means which contacts and conforms to the surface of the buffer at a bent portion of the fiber. Th coupling means can for example be a resiliently deformable material such as a polysiloxane. In a preferred aspect, the invention provides an apparatus and method for axially aligning, and preferably joining, the ends of optical fibers. The apparatus comprises means for holding two fibers so that the fiber ends are approximately abutting and axially aligned, adjacent means for passing an optical signal into one of the fibers through the buffer thereof, and adjacent means for withdrawing that signal from the other fiber through the buffer thereof. At least one of the holding means is movable to maximize the withdrawn optical signal and thus to align the fibers. The invention also includes novel splices which can be made in this way and novel splicing aids for use in the method.

34 Claims, 1 Drawing Figure

U.S. PATENT DOCUMENTS

| | | |
|---|---|---|
| 4,237,550 | 12/1980 | Steensma . |
| 4,243,296 | 1/1981 | Aulich et al. . |
| 4,243,297 | 1/1981 | Elion . |
| 4,261,641 | 4/1981 | Porter . |
| 4,266,851 | 5/1981 | Salisbury . |
| 4,268,116 | 5/1981 | Schmadel et al. . |
| 4,277,134 | 7/1981 | Upton, Jr. . |
| 4,289,398 | 9/1981 | Robichaud . |
| 4,294,513 | 10/1981 | Nelson et al. . |
| 4,301,543 | 11/1981 | Palmer . |
| 4,302,071 | 11/1981 | Winzer . |
| 4,305,641 | 12/1981 | Witte . |
| 4,307,933 | 12/1981 | Palmer et al. . |
| 4,317,614 | 3/1982 | Palmer . |
| 4,325,636 | 4/1982 | Schiffner . |
| 4,355,863 | 10/1982 | Aulich et al. . |
| 4,372,768 | 2/1983 | Zucker et al. . |
| 4,373,814 | 2/1983 | Lacombat et al. . |
| 4,378,951 | 4/1983 | Nagao . |
| 4,387,954 | 1/1983 | Beasley . |
| 4,391,517 | 7/1983 | Zucker et al. . |
| 4,398,795 | 8/1983 | Palmer . |
| 4,400,054 | 8/1983 | Biard et al. . |
| 4,402,568 | 9/1983 | Kulich et al. . |
| 4,413,879 | 11/1983 | Berthold, III et al. . |
| 4,418,981 | 12/1983 | Stowe . |
| 4,421,979 | 12/1983 | Asawa et al. . |
| 4,423,922 | 1/1984 | Porter . |
| 4,431,260 | 2/1984 | Palmer . |
| 4,441,784 | 4/1984 | Korth . |
| 4,449,244 | 5/1984 | Kopainsky . |
| 4,450,554 | 5/1984 | Steensma et al. . |
| 4,461,536 | 7/1984 | Shaw et al. . |
| 4,462,699 | 7/1984 | Shaw et al. . |
| 4,473,270 | 9/1984 | Shaw . |
| 4,473,271 | 9/1984 | Mitchell . |
| 4,474,431 | 10/1984 | Bricheno . |
| 4,474,469 | 10/1984 | Abe . |
| 4,475,789 | 10/1984 | Kahn . |
| 4,514,057 | 4/1985 | Palmer et al. . |
| 4,557,552 | 12/1985 | Newton et al. ............... 350/96.15 |

FOREIGN PATENT DOCUMENTS

| | | |
|---|---|---|
| 50135961 | 5/1977 | Japan . |
| 0010444 | 1/1978 | Japan . |
| 5468648 | 1/1979 | Japan . |
| 5466157 | 5/1979 | Japan . |
| 54-138452 | 10/1979 | Japan . |
| 1460211 | 12/1976 | United Kingdom . |

OTHER PUBLICATIONS

R. A. Miller, "Overview of Optical Waveguide Coatings" in: Fiber Optics Advances in Research and Development, (Eds) Bernard Bendow & Shashauka S. Mitra, Plenum Press ('79).

(Eds) Bernard Bendow & Shashauka S. Mitra, The American Ceramic Society (1981), pp. 27-28.

In: Advances in Ceramics, V. 2, Physics of Fiber Optics (Eds) Bernard Bendow & Shashauka S. Mitra, The American Ceramic Society (1981), pp. 14-20.

H. C. Chandan & D. Kalish, Corrosion 83, "Stress Corrosion of Optical Fibers in Outside Plant, NACE, Apr. 18-22, 1983.

Stewart E. Miller, Optical Fiber Telecommunications, Academic Press (1979).

Optical Fiber Transmission, Topical Meeting on Optical Fiber Transmission, 1/7-9/75, Williamsburg, VA.

John E. Midwinter, Optical Fibers for Transmission, John Wiley & Sons (1979), Section 12.3.1 "Surface Corrosion", pp. 277-278.

Fiber Optics: Principles and Applications, N. S. Kapany, C.1967 Academic Press, San Francisco.

Technical Digest of 3rd International Conference on Integrated Optics and Optical Fiber Communications, Apr. 27-29, 1981.

Electron, Lett. (GB) vol. 12, No. 21, pp. 567-569, Oct. 14, 1976.

Put Optical Fiber Cable in the Field—and Keep it There, Telephone, Nov. 1978, Thomas & Betts.

J. Reed, Splicing Techniques at Hawaiian Tel, Telephone Engineer & Management, Sep. 1, 1980.

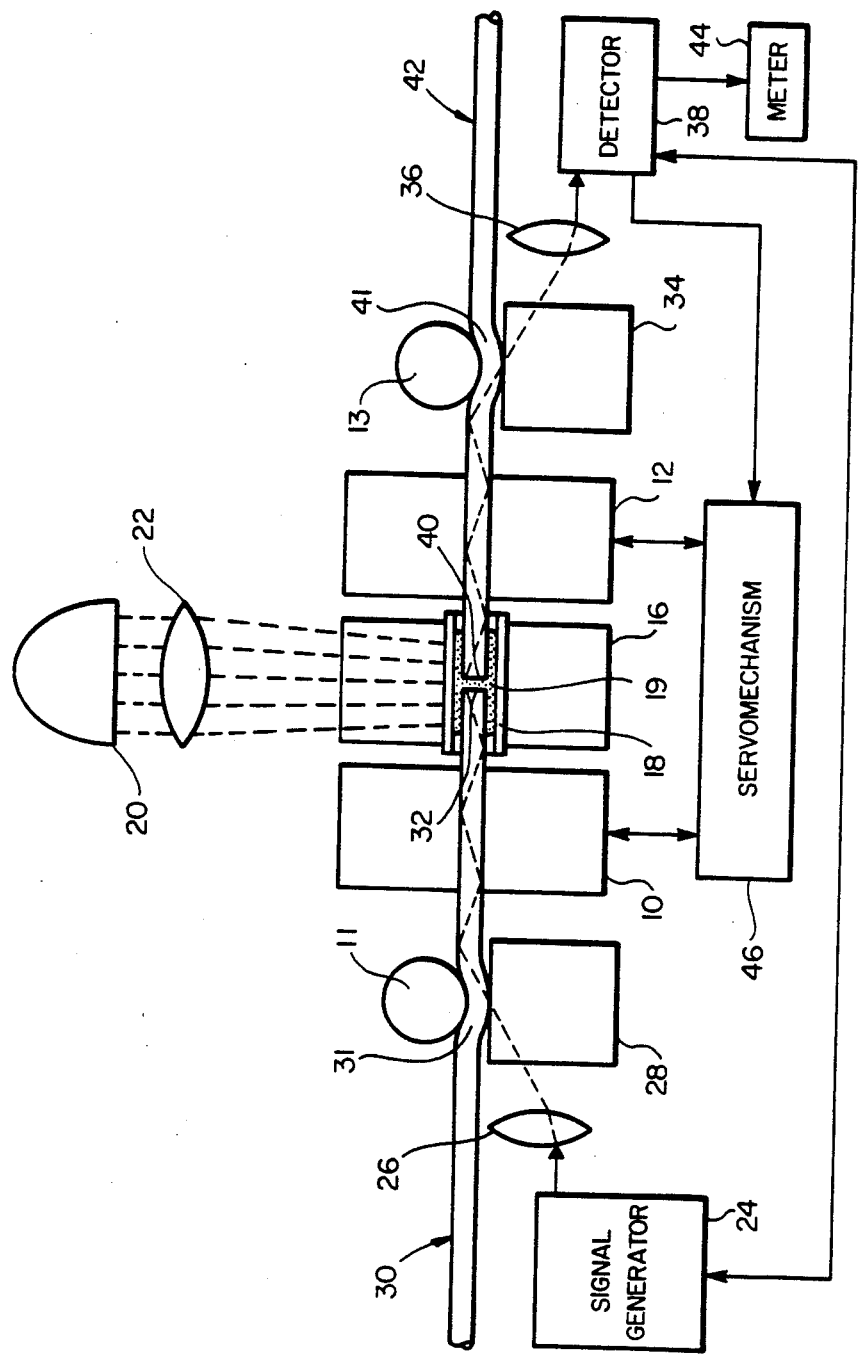

METHODS AND APPARATUS FOR OPTICAL FIBER SYSTEMS

BACKGROUND OF THE INVENTION

1. Field of the Invention

This invention relates to methods and apparatus for feeding an optical signal into an optical fiber through the buffer thereof and for withdrawing an optical signal from an optical fiber through the buffer thereof.

2. Introduction to the Invention

The most widely used optical fibers comprise a glass core, a glass cladding which surrounds the core and a buffer which surrounds the cladding and is composed of relatively soft polymeric material. Where reference is made in their specification to an "optical fiber" or an "optical fiber as defined", it is to be understood that the fiber referred to is one comprising a glass core, a glass cladding and a buffer having a refractive index greater than the cladding. The buffer protects the cladding and the core and allows the fiber to be bent into (and maintained in) a bend of substantially smaller bend radius than would otherwise be possible. The buffer may be surrounded by a jacket. Optical signals are conventionally fed into optical fibers by directing them axially at the exposed fiber end. It has also been proposed to feed an optical signal into a fiber through the side of the cladding, after removal of any buffer in the path of the signal.

It is often desirable to bring two optical fibers into precise axial alignment, so that a signal can be passed from one fiber to the other with minimum loss. Often the aligned fibers will then be joined together. The joint can be a permanent joint (usually called a "splice") made by joining the fibers directly to each other, either by fusing the fibers together or by adhering them to each other with an index-matching adhesive (i.e. an adhesive whose refractive index is chosen so that signal loss is minimized). Alternatively the joint can be a disconnectable one made by mounting the fiber ends in two mating parts of a connector and then joining the two mating parts together in such a way as to ensure alignment of the fibers.

The known methods for aligning optical fibers as defined suffer from serious disadvantages. Most of the known methods align the exteriors of the two fibers, not their cores (whose alignment is of course the dominant factor in determining the signal loss at the joint). This type of process is very much dependent on operator skills and in any case is likely to lead to poor results because the core is often not precisely in the center of the fiber. It has also been proposed to join the ends of two optical fibers by bringing the ends into approximately aligned and abutting relationship, feeding an optical signal into the remote end of one fiber, detecting the optical signal at the remote end of the other fibers, and moving the to-be-joined ends so as to maximize the detected signal, thus precisely aligning th cores in those ends. This method is capable of yielding excellent results, but is wholly impractical because of the need to establish communication links between the alignment point and the remote ends of the fibers. Borsuk, U.S. Pat. No. 4,215,937 proposes a method in which an optical fiber is centered in one part of a connector, by an optical method which makes use of an optical signal which is introduced into the fiber through the cladding, without passing through a buffer.

SUMMARY OF THE INVENTION

We have now surprisingly discovered that it is possible to introduce an optical signal into an optical fiber as defined through the buffer of the fiber, and also that it is possible to withdraw an optical signal from an optical fiber as defined through the buffer of the fiber and to detect the withdawn signal. These discoveries can be utilized in a number of methods and apparatus. One particularly valuable use of these discoveries is in bringing two optical fibers into axial alignment and, preferably, joining the aligned fibers tobether. Another valuable use is in extracting a desired porportion of an optical signal from an optical fiber.

BRIEF DESCRIPTION OF THE DRAWING

The invention is illustrated in the accompanying drawing, in which the FIGURE is a diagrammatic illustration of apparatus according to the invention for aligning and joining two optical fibers.

DETAILED DESCRIPTION OF THE INVENTION

In one aspect, the invention provides a method of axially aligning the ends of first and second optical fibers as defined, which method comprises positioning the ends of the fibers in approximately abutting and axially aligned relationship; directing an optical signal against the buffer of the first fiber at a location near the end to be aligned so that the signal passes through the buffer towards the end to be aligned; withdrawing the optical signal from the second fiber through the buffer thereof at a location near the end to be aligned; detecting the intensity of the withdrawn signal; and moving at least one of the fibers to maximize the intensity of the withdrawn optical signal. Preferably the aligned fibers are then joined together. Through use of the invention excellent splices can be quickly and conveniently made, with losses of substantially less than 0.3 dB/joint being readily and repeatably obtainable.

The preferred technique for joining the aligned fibers is by supplying a hardenable, fluid index-matching adhesive to the ends of the aligned fibers. Preferably the adhesive is polymerisable (this term being used to include adhesives which are already polymers but which can be further polymerised or cross-linked). The adhesive may be self-setting (e.g. a two-component epoxy or cyanoacrylate adhesive) but is preferably one which polymerises only when exposed to selected treatment after the fibers have been aligned. Particularly useful are photo-polymerisable adhesives which can be cured by exposure to UV light, for example a photo-initiated urethane/acrylate adhesive. Other hardenable adhesives can be used, including thermoplastic materials, for example butyrate resins. However, thermoplastic materials must be maintained at an elevated temperature until the fibers have been aligned. The hardened adhesive will usually have a refractive index which is not substantially less than that of a fiber core, i.e., at least 1.4, preferably at least 1.5, and will be transparent to radiation of at least one of the frequencies used as a signal in optical fibers (typically 810–860, 1280–1320 and 1450–1550 nanometers).

The improved alignment method of the present invention makes possible a new and improved technique for delivering an index-matching adhesive to the fibers. This technique makes use of a new splicing aid which forms part of the invention. Thus the invention provides, in another aspect, an article which is suitable for use in splicing two optical fibers and which comprises (1) a generally tubular monolithic straight container which has two open ends, whose smallest internal cross-sectional dimension is at least 300 microns, and whose smallest internal cross sectional radius of curvature is preferably at least 125 microns, and (2) a mass of hardenable adhesive which is contained within the container, which is the only material within the container, which is retained in the container by surface tension forces when the tube is maintained in a horizontal position at the splicing temperature, preferably at 23° C., and which, when hardened, is transparent to radiation of at least one of the frequencies used as a signal in optical fibers. The container is preferably a tube having an annular cross-section, but it can also be a tube having a different closed cross-section, or an open trough or another form of container which will contain and retain the adhesive; all such containers are included by the term "generally tubular container" as used herein. The container can if desired be fitted with removable end caps which seal the open ends of the container, thus keeping the adhesive clean and, if necessary, preventing it from leaking out of the container.

When using this new splicing aid, the fibers are pushed into the adhesive within the container and are then aligned within the container. The container may be composed of, for example quartz glass, metal or a polymeric composition, provided that it permits (and is not damaged by) the desired process for hardening the adhesive. An advantage of this technique is that fluid flow of the adhesive about the fibers as they are inserted into the adhesive helps to ensure that the fiber ends are free of foreign matter. Another advantage is that it is not necessary to strip the buffer from the fiber end (though this can be done if desired).

The internal dimensions of the container should be such as to allow adequate movement of the fibers during the alignment process. The fiber buffers preferably lie within the mass of adhesive, and therefore the smallest internal cross-sectional dimension of the container is preferably at least 1.2, e.g. 1.6 times, especially 1.5 to 6, e.g. 3 to 6 times, the external diameter of the buffer of the fiber. The larger the smallest internal cross-sectional dimension, the wider the range of fiber sizes for which a particular container will be suitable, but the greater the difficulty of retaining a polymerizable adhesive within the container. In view of these considerations, the smallest internal cross-sectional dimension is preferably at least 300 microns, for example at least 400 microns, particularly at least 750 microns, especially at least about 1000 microns, but preferably less than 3000 microns, especially less than 1500 microns, e.g. 750 to 1500 microns. When the container has an annular cross-section, as is preferred, the smallest internal cross-sectional dimension is of course the internal diameter of the container. The hardenable adhesive used in the novel splicing aid preferably has a viscosity such that it is retained in the container at 23° C. with the container horizontal, and more preferably under all other conditions likely to be encountered before the adhesive is hardened. On the other hand, its viscosity should not be such that it is difficult to insert and move the optical fibes under the splicing conditions. We prefer to use an adhesive having a viscosity of 750 to 2500 centipoise, particularly 1200 to 2000 centipoise, e.g. about 1600 centipoise (viscosities referred to herein are measured at 23° C. using a Model HBT Brokfield Viscometer, Spindle No. SC4-27 rotating at 100 rpm).

The adhesive may alternatively be retained in, for example, a small polymeric bulb attached (or capable of attachment) to one of the ends of the container, and be dispensed into the container when the container is to be used. This offers particular advantage if a two-component adhesive is used, since a two-part bulb may be employed.

Through use of the new splicing aid, splices which are novel per se can be prepared. Thus the invention provides, in another aspect, a splice between two axially aligned optical fibers as defined, the fibers being joined together by a mass of an index-matching adhesive, the adhesive being contained within a generally tubular straight container whose smallest internal cross-sectional dimension is at least 300 microns and which does not contact the fibers at any point.

Another technique for joining the aligned fibers is by fusing together the ends of the fibers. Known techniques e.g. use of an electric arc, are suitable for this purpose. However, these techniques require a high degree of operator skill and require the buffer to be stripped from the fibers.

After splicing the optical fibers together, the splice can if desired be protected by shrinking a heat-shrinkable polymeric sleeve over the splice.

Another technique for joining the aligned fibers is to mount the fibers in mating parts of an optical fiber connector, and to secure the connector parts to each other. In this technique the fibers may be connected to each other through an intermediate body. Preferably the mating parts are adjustably secured to each other and are adjusted to maximize the intensity of the withdrawn signal. After the adjustment is complete, the parts are fixed in the desired position.

In another aspect, the invention provides apparatus which is suitable for carrying out the alignment method described above and which comprises
(1) first holding means for holding a first fiber as defined near the end thereof;
(2) means for generating an optical signal and for directing the signal against the buffer of a first fiber held in the first holding means so that the signal passes through the buffer of the first fiber towards the end of the fiber;
(3) second holding means for holding a second fiber as defined near the end thereof, in a position in which the end of the second fiber is approximately abutting and axially aligned with the end of a first fiber held by the first holding means; and
(4) means for withdrawing an optical signal from a second fiber held in the second holding means, the signal being withdrawn through the buffer of the second fiber, and for detecting the intensity of the withdrawn signal;
at least one of the first and second holding means being movable in relation to the other so as to maximize the optical signal detected by the means (4) and thus to obtain precise axial alignment of the cores of the first and second fibers.

The signal-generating means in such apparatus can be for example a laser or a light-emitting diode. The output of the signal-generating means can if desired be modified in response to the intensity of the withdrawn signal so that the sensitivity of the detection means is maintained at a predetermined (and suitably high) level. This is desirable, for example, if the sensitivity of the detection means decreases if the intensity of the detected signal exceeds a particular value.

The holding means in such apparatus can be one of those well-known in the art, eg. a vacuum chuck or a precision groove.

The moving of the two holding means can be effected manually, but preferably the apparatus also comprises a servomechanism which moves at least one of the holding means in response to the intensity of the withdrawn signal and thus aligns the fibers. The apparatus can also comprise means for delivering a fluid index-matching adhesive to the ends of the fibers, preferably means for holding a container containing such adhesive so that the ends of the fibers can be aligned within the adhesive. Preferably the apparatus then also comprises means for hardening such an adhesive, e.g. a high intensity UV light source. Alternatively the apparatus can also comprise means for fusing the ends of the fibers.

We have discovered two important means for facilitating the feeding of an optical signal into an optical fiber as defined through the buffer thereof. Thus we have discovered that by directing the optical signal at a bent portion of the optical fiber and by suitably adjusting the directions of the signal and the fiber, the proportion of the signal which passes through the buffer and into the fiber can be substantially increased. The angle between the signal and the tangent to the fiber core at the point of impact of the signal is preferably less than the acceptance angle of the fiber, for example not more than 20°, particularly not more than 10°, especially substantially 0°. The bend radius of the bent portion of the fiber is preferably 1.5 to 15 mm, e.g. 3 to 15 mm, particularly 3 to 8 mm, e.g. 4 to 8 mm. The point of impact of the signal is preferably at the point where the bend in the fiber straightens out, so that the signal is preferably directed along an essentially straight length of fiber. We have also discovered that by applying a suitable coupling means to the buffer of the fiber (particularly a bent portion of a fiber as described above), the proportion of the signal which passes through the buffer and into the fiber can be substantially increased. The coupling member should (a) conform to the surface of the buffer of the fiber, (b) lie in the path of the optical signal directed at the fiber and (c) increase the proportion of the signal which passes through the buffer and into the fiber. Thus we have found that the proportion of the signal which passes through the buffer and into the fiber can be increased substantially by placing on the buffer, where the signal impinges on it, a block of a polysiloxane or other suitable resiliently deformable material. The signal preferably impinges on the coupling member in a substantially perpendicular direction, to minimize reflection and refraction effects at the surface.

A similar improvement results if the polysiloxane block is replaced by a suitable member, e.g. a finger, which has been dipped in water, isopropyl alcohol or other suitable liquid. The pressure exerted on the fiber by the coupling means is important, and excessive pressure can decrease or completely remove the desired improvment. Thus, although a degree of conformance between the coupling means and the fiber is important, too great a pressure (which may result in loss of conformance and/or distortion of the fiber) is to be avoided. Thus when a resiliently deformable block is used, its Young's modulus is preferably less than that of the buffer, for example less than $10^7$ N/m². The coupling means should of course be transparent to the optical signal and the refractive index thereof is preferably higher than the refractive index of the buffer of the fiber, for example preferably at least 1.3, particularly, at least 1.35, and preferably approximately equal to the refractive index of the buffer, preferably within ±0.2, particularly ±0.1 of the refractice index of the buffer. It is believed that the coupling means may function as a lens to focus the optical signal in a beneficial way. Once having passed through the buffer of the fiber, the signal preferably also passes through the cladding and is propagated in the core; however the signal can also be propagated through the cladding or through the cladding and the core.

We have further discovered that the two means described above are also useful in increasing the proportion of an optical signal which can be removed from an optical fiber, through the buffer of the fiber, at a desired location. It is known tht the proportion of an optical signal which is lost from an optical fiber increases as the bend radius of the fiber decreases, and this has previously been regarded as a serious disadvantage. The present invention, by contrast, can make positive and advantageous use of this fact. When a coupling means as described above is applied to a bent portion of an optical fiber which carries an optical signal, the proportion of the signal which is removed in the region of the coupling means is substantially higher than it is at other points on the fiber having the same bend radius.

The discoveries just referred to can be put to good use in the alignment apparatus and method previously described. Thus the optical signal is preferably directed against a bent portion of the first fiber, the bent portion preferably having a bend radius of 1.5 to 15 mm, e.g. 3 to 15 mm, particularly 3 to 8 mm, e.g. 4 to 8 mm, and the angle between the signal and the tangent to the fiber at the point of signal impact being preferably not more than 20°, particularly not more than 10°, especially substantially 0°. It is also preferred that a coupling means as described above be applied to the first fiber, especially to a bent portion of the first fiber. Similarly, in order to increase the proportion of the signal which is withdrawn and detected, it is preferred that the second fiber have a bent portion therein, a tangent to the bent portion preferably passing directly into the detection means, and/or that there is applied to the second fiber a coupling means which (a) conforms to the surface of the second fiber and (b) increases the proportion of the signal which is withdrawn and detected. Generally it will be convenient for similar bends to be put into the first and second fibers and for similar coupling means to be applied thereto; however different expedients can be used for the two fibers.

However, these discoveries are not only useful in the alignment apparatus and method, but also in other apparatus and methods, for example methods for determining whether or not an optical fiber is carrying an optical signal, methods for removing a desired proportion of an optical signal from an optical fiber carrying a signal, and methods for feeding an optical signal into an optical fiber through the buffer thereof.

Thus in another aspect, the invention provides a method of detecting an optical signal in an optical fiber, which method comprises (1) applying to a bent portion of the fiber a coupling means which (a) conforms to the surface of the buffer of the fiber and (b), when an optical signal is passing through the fiber, increases the proportion of the signal which is withdrawn through the buffer of the fiber; and (2) passing any withdrawn optical signal into a detection means. The detection means can simply determine whether the intensity of any withdrawn signal exceeds a particular level (as might be done for example when testing for fiber continuity). Alternatively the detection means can provide a quantitative measure of the intensity of any withdrawn signal; in this case the intensity of the withdrawn signal can be used to modify another variable. The withdrawn signal can be fed directly into a detection means adjacent the coupling means. Alternatively the withdrawn signal can be fed into a second optical fiber and the detection means can be placed at the other end of the second optical fiber. The detection means can be a piece of telecommunication apparatus, e.g. a telephone or a computer. The smaller the radius of the bend in the fiber, the greater the proportion of the signal which is withdrawn from the fiber in the vicinity of the coupling means. In this way it is possible to remove a desired proportion of an optical signal from an optical fiber. The coupling means and the radius of the bend in the fiber are preferably correlated so that at least 0.5%, for example at least 1% or at last 2%, but, especially when a plurality of points of signal withdrawal are desired, for example not more than 4% and usually not more than 3%, of any optical signal is withdrawn. The bend radius is usually in the range of 1.5 to 15 mm, e.g. 3 to 15 mm, preferably 3 to 8 mm, e.g. 4 to 8 mm.

In another aspect, the invention provides a method of feeding an optical signal into an optical fiber as defined which method comprises (1) generating an optical signal; (2) directing the optical signal at a portion of the fiber which is contacted by a coupling means which (a) conforms to the surface of the buffer of the fiber, (b) lies in the path of the optical signal directed at the fiber and (c) increases the proportion of the optical signal which passes through the buffer of the fiber. The coupling means, which is preferably as described above, preferably contacts a bent portion of the fiber, the bend radius being preferably from 1.5 to 15 mm, e.g. 3 to 15 mm, particularly 3 to 8 mm, e.g. 4 to 8 mm, and the angle between the signal and the tangent to the fiber at the point of signal impact being preferably not more than 20°, particularly not more than 10°, especially substantially 0°.

In another aspect, the invention provides apparatus comprising (1) an optical fiber as defined and (2) an optical coupling means which contacts and conforms to the surface of the buffer of the fiber. The coupling means preferably contacts a bent portion of the fiber, the bend radius being preferably from 1.5 to 15 mm, e.g. 3 to 15 mm, particularly 3 to 8 mm, e.g. 4 to 8 mm. The apparatus can also comprise (a) means for generating an optical signal and directing the signal at the fiber through the coupling means or (b) means for detecting an optical signal withdrawn from the fiber via the coupling means.

The invention is illustrated by the accompanying drawing, in which the Figure is a diagrammtic view of apparatus according to the invention for aligning and joining two optical fibers.

Referring now to the Figure, a first optical fiber 30 having an end 32 is maintained in a desired configuration by a first adjustable holding means 10 and a first bending means 11 which maintains a bent portion 31 in the fiber. First optical coupling means 28 contacts the bent portion 31 of the first fiber. A second optical fiber 42 having an end 40 is maintained in a desired configuration by a second adjustable holding means 12 and a second bending means 13 which maintains a bent portion 41 in the fiber. Second optical coupling means 34 contacts the bent portion 41 of the second fiber. The ends (38, 40) of the first and second fibers lie within a tube 18 which contains a UV-curable index-matching adhesive 19 and which is held in position by tubeholder 16. Signal-generating means 24 generates an optical signal which passes through a focusing means such as lens 26 and the first coupling means 28 before striking the buffer of the bent portion 31 of the first fiber 30. The optical signal enters the first fiber 30 and then passes through the second fiber 40 until it reaches the bent portion 41, where a portion of the signal is withdrawn through second coupling means 34 and passes via focusing means such as lens 36 to a detector 38. The signal received by detector 38 can be displayed on a meter 44 and/or can be fed to a servomechanism 46 which is linked to the adjustable holding means 10 and 12 and by means of which the holding means 10 and 12 are automatically adjusted relative to each other in order to maximize the detected signal, thus providing for alignment for the fibers without calling for high skill from the operator. The detector 38 and the signal generator 24 are preferably linked to each other so that the intensity of the generated signal is automatically adjusted to a level at which the detected signal lies in the range of maximum sensitivity of the detector and preferably also so that the detector ignores unwanted variations in the intensity of the generated signal. The apparatus also comprises a UV light source 20 and an associated focusing means such as lens 22. When the fiber ends 32 and 40 have been precisely aligned, the UV light source is switched on for a time sufficient to cure the adhesive 19.

The invention is further illustrated by the following Example.

EXAMPLE

An automated apparatus as illustrated in the Figure was used to splice two identical optical fibers. The fibers (which are available from Corning Glass under the trade designation Glass Code 1516) consisted of a glass core of diameter 50 microns, a glass cladding of outer diameter 125 microns and a polyacrylate buffer of outer diameter 250 mirons. The buffer was stripped from the fiber ends and the stripped fiber ends were cleaved to provide clean end surfaces about 3 mm from the end of the buffer. Each of the fibers was then secured in the desired configuration by the holding and bending means. Each of the holding means comprised two plates facing each other, one of the plates containing a groove in which the fiber was placed. Each of the bending means comprised a round post having a radius of about 5 mm and containing a circumferential groove in which the fiber was placed. Each of the coupling means was a rectangular block of a poly(dimethyl siloxane) having a refractive index of about 1.41 and a Shore A hardness of about 45 (this material is available in its uncured state from General Electric under the trade designation RTV 108 or RTV 615). The signal generator was a high intensity infrared light-emitting diode having a peak at about 840 nm (available from RCA under the trade designation SG1010) with associated electronics, and the signal was directed approximately tangentially towards the bent portion of the first fiber through the first coupling means.

The detector was an infrared-sensitive PIN diode (available from Hewlett Packard under the trade designation 4707-8134) with associated electronics, and was positioned to receive a signal leaving tangentially from the bent portion of the second fiber through the second coupling means. The signal generator and detector were linked in the preferred way described above, and the detector was linked to a servomechanism which automatically moved the holding means so as to maximise the signal received by the detector. The servomechanism comprised a microprocessor (available from Intel under the trade designation 8085) with associated memory, interfaces and power supply. The tubeholder held a quartz glass tube (inner diameter 1000 microns, outer diameter 2000 microns and length about 1.3 cm) which contained a UV-polymerisable adhesive having a refractive index (when cured) of about 1.54. The adhesive comprised about equal parts by weight of a urethane/arcylate oligomer (available from Polymer Systems under the trade designation Purelast 186) and isobornyl acrylate, and a small quantity of a photo-initiator.

The two holding means were first widely separated so that the adhesive-filled tube could be placed between the fiber ends. The holding means were then moved so that the fibers were pushed into the adhesivefilled tube until the fiber ends were almost touching in the center of the tube. The fibers were then precisely aligned. When alignment was complete, the ultraviolet light was turned on to polymerise the adhesive.

An excellent splice was obtained.

We claim:

1. A method of withdrawing an optical signal from a core of an optical fiber, the fiber comprising the core, a cladding, and a buffer, comprising the steps of:
    bending a portion of the optical fiber about a bend radius sufficiently small such that core light can be withdrawn from the fiber core at the bent fiber portion by using an optical coupler, the buffer having a refractive index greater than the cladding;
    withdrawing part of the optical signal from the optical fiber core through the buffer and into the optical coupler at the bent fiber portion; and
    detecting the withdrawn optical signal part.

2. The method of claim 1, further comprising the step of determining whether the intensity of the withdrawn optical signal part exceeds a predetermined level.

3. The method of claim 2, further comprising the step of determining a quantitative measure of the intensity of the withdrawn optical signal part.

4. The method of claim 1, wherein the portion of the optical fiber is bent about a radius between 1.5 mm and 15 mm.

5. The method of claim 4, the radius being between 3 mm and 8 mm.

6. The method of claim 1, the optical coupler being transparent and having an index of refraction of at least 1.35.

7. The method of claim 1, wherein the optical coupler includes a solid material.

8. The method of claim 7, wherein the optical coupler further includes a liquid material adjacent the solid material.

9. The method of claim 7, wherein the material is a polysiloxane.

10. The method of claim 7, the optical coupler includes a resiliently deformable material.

11. The method of claim 10 wherein the optical coupler further includes a liquid material adjacent the deformable material.

12. The method of claim 1, the optical fiber comprising a cylindrical glass core surrounded by a cylindrical glass cladding surrounded by a cylindrical polymeric buffer.

13. The method of claim 1, further comprising the step of feeding the withdrawn signal part directly into an optical detector.

14. A method of feeding an optical signal into a core of an optical fiber, comprising the steps of:
    bending a portion of the optical fiber having a core, a cladding, and a buffer at the bent portion about a radius small enough such that an optical signal can be fed into the core as a guided mode by passing through the buffer and cladding at the optical fiber portion, the buffer having a refractive index greater than the cladding; and
    directing the optical signal within an optical coupler and into the optical fiber such that the optical signal passes through the buffer and the cladding and then into the optical fiber core as a core guided signal at the bent portion of the optical fiber.

15. The method of claim 14, a bent radius of the bent portion of the optical fiber being between 1.5 and 15 mm.

16. The method of claim 15, the bend radius being between 3 and 8 mm.

17. The method of claim 14, wherein the optical coupler includes a solid material.

18. The method of claim 17, wherein the optical coupler further includes a liquid material adjacent the solid material.

19. The method of claim 17, wherein the optical coupler is a resiliently deformable material.

20. The method of claim 19, the material being a polysiloxane.

21. The method of claim 14, wherein the optical coupler is transparent and has a refractive index of at least 1.35.

22. The method of claim 14, wherein an angle between the optical signal and the tangent to the fiber at the point of signal impact is at most 20°.

23. The method of claim 18, wherein the optical fiber comprises a cylindrical glass core surrounded by a cylindrical glass cladding surrounded by a cylindrical polymeric buffer.

24. An apparatus for withdrawing an optical signal from a core of an optical fiber, comprising:
    an optical fiber comprising a core, a cladding, and a buffer at a fiber section where an optical signal is to be withdrawn, the buffer having a refractive index greater than the cladding;
    an optical coupler;
    means for bending the section of the optical fiber against the optical coupler about a radius small enough such that part of the optical signal guided by the core of the optical fiber is withdrawn from the core so as to pass through the cladding and the buffer and into the optical coupler; and
    means for detecting the withdrawn optical signal part.

25. The apparatus of claim 24, the core, cladding, and buffer each being cylindrical, the core and cladding each being glass.

26. The apparatus of claim 24, the detecting means being disposed adjacent the optical coupler.

27. The apparatus of claim 1, the optical coupler including a solid material.

28. The apparatus of claim 2, the optical coupler further including a liquid material adjacent to the solid material.

29. The apparatus of claim 27, the solid material being resiliently deformable.

30. An apparatus for feeding an optical signal into a core of an optical fiber, comprising:

an optical fiber including a core, a cladding, and a buffer at a fiber section where an optical signal is to be fed into the fiber core as a guided mode, the buffer having a refractive index greater than the cladding;

an optical coupler;

means for generating the optical signal; and means for bending the optical fiber section against the optical coupler about a radius small enough such that the optical signal passes through the optical coupler, the buffer, the cladding, and into the optical fiber core as a guided signal.

31. The apparatus of claim 30, the core, cladding, and buffer each being cylindrical, the core and cladding being glass.

32. The apparatus of claim 31, the optical coupler including a solid material.

33. The apparatus of claim 32, the optical coupler further including a liquid material adjacent to the solid material.

34. The apparatus of claim 32, the solid material being resiliently deformable.

* * * * *